(12) United States Patent
 Soto et al.

(10) Patent No.: US 11,437,665 B2
(45) Date of Patent: Sep. 6, 2022

(54) BATTERY THERMAL AND POWER CONTROL SYSTEM

(71) Applicant: Rocky Research, Boulder City, NV (US)

(72) Inventors: Robert Soto, Huntsville, AL (US); Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 134 days.

(21) Appl. No.: 16/915,623

(22) Filed: Jun. 29, 2020

(65) Prior Publication Data

US 2021/0408618 A1 Dec. 30, 2021

(51) Int. Cl.
| | |
|---|---|
| *H01M 10/63* | (2014.01) |
| *H01M 10/48* | (2006.01) |
| *H01M 10/613* | (2014.01) |
| *H01M 10/643* | (2014.01) |
| *F41H 13/00* | (2006.01) |
| *H01M 10/6563* | (2014.01) |

(52) U.S. Cl.
CPC ........ *H01M 10/63* (2015.04); *F41H 13/0062* (2013.01); *H01M 10/482* (2013.01); *H01M 10/486* (2013.01); *H01M 10/613* (2015.04); *H01M 10/643* (2015.04); *H01M 10/6563* (2015.04); *H01M 2220/30* (2013.01)

(58) Field of Classification Search
CPC .. H01M 10/63; H01M 10/613; H01M 10/643; H01M 10/6563; H01M 10/482; H01M 10/486
See application file for complete search history.

(56) References Cited

U.S. PATENT DOCUMENTS

| | | | | |
|---|---|---|---|---|
| 6,330,925 | B1 * | 12/2001 | Ovshinsky | .......... H01M 10/617 |
| | | | | 180/65.245 |
| 10,631,444 | B2 | 4/2020 | Protz | |
| 2007/0144804 | A1 * | 6/2007 | Pike | .................. H01M 10/6562 |
| | | | | 180/170 |

(Continued)

FOREIGN PATENT DOCUMENTS

| | | |
|---|---|---|
| CN | 209 295 779 | 8/2019 |
| DE | 10 2012 000672 | 4/2013 |

OTHER PUBLICATIONS

International Search Report and Written Opinion dated Feb. 16, 2022 in PCT/US2021/036837.

*Primary Examiner* — Jimmy Vo
(74) *Attorney, Agent, or Firm* — Shumaker & Sieffert, P.A.

(57) ABSTRACT

Disclosed are battery systems for powering a laser weapon, and methods of thereof. A system includes a battery bank comprising a plurality of cylindrical battery cells electrically connected in series and parallel to form a plurality of modules, wherein an air flow path through each module defined by a spacing between a surface of each battery cell and its neighboring battery cell. Furthermore a control system is configured to provide cooling via airflow from the one or more fans to temperature control the battery modules to prevent the temperature difference between a first side of the battery module and a second side of the battery module from rising above a predetermined threshold while the laser weapon is active and consuming energy from the battery bank.

30 Claims, 4 Drawing Sheets

(56) References Cited

U.S. PATENT DOCUMENTS

| | | | | |
|---|---|---|---|---|
| 2008/0076011 A1* | 3/2008 | Emori | ................. | B60L 58/24 |
| | | | | 429/62 |
| 2009/0320715 A1* | 12/2009 | Morita | ............... | H01M 10/635 |
| | | | | 105/51 |
| 2016/0204478 A1* | 7/2016 | Iguchi | ................ | H01M 10/482 |
| | | | | 429/62 |

* cited by examiner

BATTERY THERMAL AND POWER CONTROL SYSTEM

BACKGROUND

Field

This disclosure relates generally to a modular battery system for powering a Directed Energy Weapon (DEW) system. In particular, the battery system may include a plurality of modules and an air flow path through each module, which allow for controlling the temperature of battery cells in the modules from rising above a predetermined threshold.

Description of the Related Art

There are many types of Directed Energy Weapon (DEW) systems being developed, each using a type of focused energy to destroy a target. These DEW systems may use a laser, microwave or particle beam to target missiles, vehicles, Unmanned Aerial Systems (UAS), airplanes or other targets. Each type of DEW system fires relatively short, intense bursts of energy. Some of these systems include battery banks to power the DEW system. However, these battery banks generate high heat loads during operation that need to be cooled in order for the DEW system to continue firing without overheating.

Mobile and smaller DEW systems have size, weight and power (SWAP) requirements that make it difficult to install bulky, heavy cooling systems on, for example, the battery system of a portable DEW platform. Conventional vapor compression systems may be efficient at cooling environmental loads, such as rooms or systems with relatively slow gains in heat. However, such systems may not provide rapid cooling features due to the long duration, of up to a minute or in some cases more, to reach full capacity. In some cases, a conventional vapor compression system may take several minutes or longer to provide sufficient cooling to a load. Even once these vapor compression systems are running, their weight, size and power requirements may make them inappropriate for use in DEW systems for laser and battery cooling purposes.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods.

One embodiment is a system for powering a laser weapon. This system includes a battery bank comprising a plurality of cylindrical battery cells electrically connected in series and parallel to form a plurality of modules; an air flow path through a first module of the plurality of modules, wherein the air flow path is defined by a spacing between a cylindrical surface of each battery cell and its neighboring battery cell; one or more fans positioned to move air through the air flow path; a temperature sensor and a voltage sensor communicating with the first module; an electrical output providing electrical power to a laser weapon; and a control system configured to provide cooling via airflow from the one or more fans to temperature control the battery cells across their cylindrical surface to maintain a temperature gradient of less than about 15° C. from a first side of the first module to a second side of the first module, and further to prevent the temperature of the battery cells from rising above a predetermined threshold while the laser weapon is active and consuming energy from the battery bank.

Another embodiment is a method of powering a laser weapon. This method includes providing a battery bank comprising a plurality of cylindrical battery cells electrically connected in series and parallel to form a plurality of modules; activating one or more fans to direct an air flow path through a first module of the plurality of modules, wherein the air flow path is defined by a spacing between a cylindrical surface of each battery cell and its neighboring battery cell; monitoring a temperature sensor to determine the temperature of the battery cells within the first module; and controlling the number or speed of the one or more fans to maintain a temperature gradient of less than about 15° C. from a first side of the first module to a second side of the first module, and further to prevent the temperature of the battery cells within the first module from rising above a predetermined threshold while the laser weapon is active and consuming energy from the battery bank.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Figure 1:
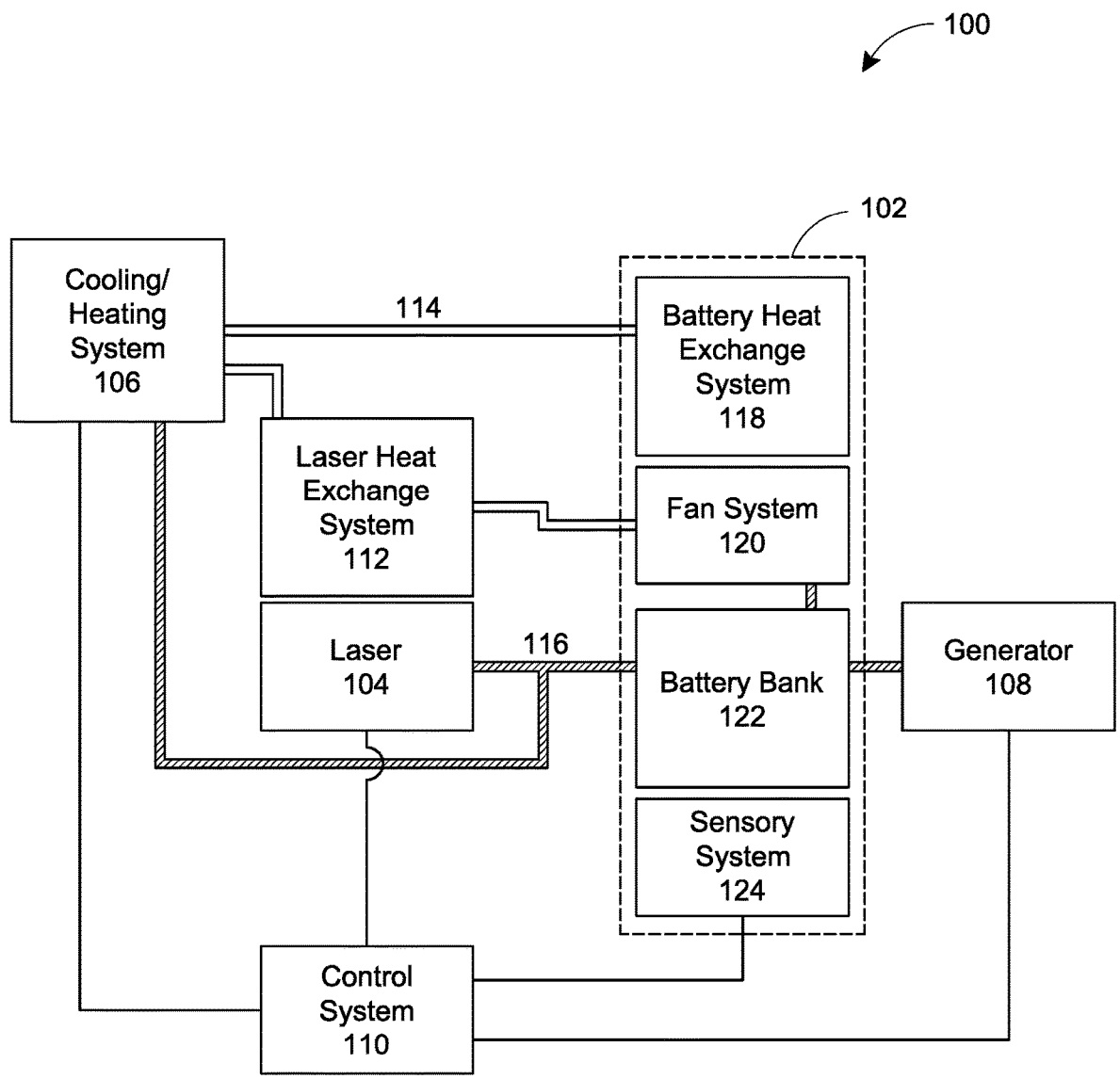
FIG. 1 is a schematic of an energy weapon (DEW) platform according to some embodiments.

A Directed Energy Weapon (DEW) system and platform are described, which includes systems and methods for managing the temperature and power output of a battery bank configured to provide power to the DEW system. The DEW system may be located on a portable platform, and include a battery bank that provides the bursts of power necessary to repeatedly activate a laser weapon during one or more laser activation cycle.

The battery bank may be made up of a plurality of battery modules, with each battery module containing a plurality of battery cells in a specific geometric configuration. The geometric configuration allows an air flow path to be formed between the battery cells so that one or more fans located adjacent to the battery bank can move ambient air through the air flow path to cool the battery cells. The battery bank may also include temperature and voltage sensors so that a control system can monitor and control the operations of the battery bank depending on the ambient temperature, battery cell temperatures and voltage of each battery cell or battery module.

In some embodiments, the control system is configured to cool or heat the battery bank by directing airflow from one or more fans to control the temperature of the battery cells within each battery module. In one embodiment, the one or more fans direct ambient air across the cylindrical surface of each battery cell to maintain a temperature gradient of less than about 5° C. from one end to the other end of each battery cell. In other embodiments, the control system may activate the one or more fans to direct airflow across the battery cells to maintain a temperature gradient from one end of a battery cell to the other that is less than 4° C., 3° C., 2° C. or 1° C.

Moving air flow across each battery cell may further prevent the temperature of the battery cells from rising above a predetermined threshold while the laser weapon is active and consuming energy from the battery bank. In some embodiments, the one or more fans in communication and the battery bank and directing ambient air across the surface of the battery cells may provide sufficient cooling power to maintain the battery cells within a predetermined threshold temperature. For example, the control system may control the number of active fans, or speed of each fan, or both, to maintain the temperature of the battery cells within the battery bank within their threshold temperature.

In one embodiment, the control system controls the fans to maintain a predetermined temperature difference between the battery cells in a module located proximal to the fans and the battery cells in the same module located distal from the fans. As the cooled air from the one or more fans runs along the air path within each module it becomes warmed from each battery module. Thus, the air temperature at a first side of a battery module that is proximal to the fans will be cooler than the air at a second side of the battery module that is distal to the fans. The control system may use temperature sensors within each module to ensure that the temperature of the battery cells near the first side proximal to the fans do not differ from the temperature of the battery cells near the second side distal to the fans by more than 15° C. in some embodiments. In other embodiments, the control system manages the speed and number of fans that are active to ensure that the temperature difference is not greater than 10° C. or 5° C. between the proximal and distal battery cells at the first and second sides of the battery module.

The battery bank is designed with a particular air flow path that allows the battery cells to be cooled or heated using the one or more fans. In some embodiments, the battery bank includes an air flow path through each separate battery module. In some embodiments, the air flow path comprises a spacing defined between a surface (e.g. a cylindrical surface) of each battery cell and its neighboring battery cell. In some embodiments, the spacing to allow the air flow path between adjacent battery cells is, is about, is at least, is at least about, is at most, or is at most about, 0.5 mm, 1 mm, 2 mm, 3 mm, 4 mm, 5 mm, 6 mm, 7 mm, 8 mm, 9 mm, 10 mm, 12 mm, 15 mm or 20 mm, or any range of values therebetween.

In some embodiments, the fan system includes one or more fans. In some embodiments, the one or more fans are single speed fans. In some embodiments, the one or more fans are variable speed fans. In some embodiments, the fan system is configured to push air through the air flow path that traverses each battery module in the battery bank. In some embodiments, the fan system is configured to pull air through the air flow path. In some embodiments, the fan system includes, or includes at least, 1, 2, 3, 4, 5, 6, 8, 10, 15 or 20 fans, or any range of values therebetween.

However, in some embodiments, the temperature of the ambient air is too hot or too to cool or heat the battery cells to their target temperature. For this reason, in one embodiment, the one or more fans may be positioned in thermal communication with a heat exchanger that is part of a heating/cooling loop on the DEW platform. The heating/cooling loop may be thermally connected to a vapor compression system that cools or heats heat transfer fluid that may run through the heat exchanger adjacent to the one or more fans. By controlling the vapor compression system and valves within the heating/cooling system on the platform, the control system can intelligently route cooling or heating power to the heat exchanger adjacent to the one or more fans. The one or more fans can then be controlled by the control system to direct cooled or heated air from the heat exchanger into the battery bank and across the individual battery modules.

It should be realized that while the description here may refer to a vapor compression cooling system for maintaining a DEW system within an operational temperature range, it should be realized that the vapor compression system may also be used to warm the battery cells in cold environments, such as during the winter. In this embodiment, the vapor compression system may increase the temperature of the heat transfer fluid in the heating/cooling loop and pump that warmed heat transfer fluid to the heat exchanger located adjacent to the one or more fans so that activation of the one or more fans directs warmed air across each battery cell to increase the temperature of the battery cell to an operational temperature.

In some embodiments, the heat transfer fluid is approximately 30% to 50% ethylene or propylene glycol in water, however, other compositions of heat transfer fluid are also within the scope of embodiments of this invention. For example, alcohol or acetone water mixtures or similar heat transfer fluids are also possible. In one embodiment the heat transfer fluid is a refrigerant being pumped through the heating/cooling loop, which would undergo a phase change in the heat exchangers. The vapor compression system may also consist of more than one heating/cooling loop and be configured as a combination of heat transfer fluid and refrigerant circuits.

In some embodiments, the control system is configured to allow the temperature of the battery cells within each module to reach a particular target temperature before the one or more fans are activated to begin cooling the battery bank. For example, the battery cells may work more efficiently at a temperature of 40° C. than at lower temperatures. Thus, the control system may use temperature sensors connected to the battery cells or modules to detect then the battery cells are below 40° C. and prevent activation of the one or more fans until the temperature of the battery cells rise at, or above 40° C. so the battery cells will operate at a higher efficiency. The control system may be configured to allow the battery cells within each module to reach or operate at a various target temperatures or temperature ranges. As such, it is to be understood that the control system may accommodate a wide variety of battery chemistries. In some embodiments, the control system is configured to allow the battery cells to operate at, at about, at at-least, or at at-least about, 0° C., 10° C., 20° C., 30° C., 40° C., 50° C., 60° C., 70° C., 80° C., 90° C. or 100° C., or any range of values therebetween.

Similarly, the control system may monitor the temperature of the battery cells when the battery bank is being charged by the generator. The battery cells may charge more efficiently when their temperature is above 0° C., and particularly when their temperature is above 25° C.-40° C. In some embodiments, the battery system includes one or more sensors connected to the control system. In some embodiments, the one or more sensors are temperature sensors and/or voltage sensors. In some embodiments, the one or more sensors measure values (e.g. temperatures and/or voltages) of the battery bank and/or battery cells. For example, temperature sensors may be used to measure a temperature gradient of a battery cell or within a battery module, as described herein.

Mobile DEW applications generally require battery cells capable of high discharge C-rates, otherwise the size and weight of the battery system may be impractical. The high duty cycle (e.g. >20%) and short period of the DEW duty cycle demand high charge C-rates in addition to high discharge C-rates, which are inherent characteristics of battery cells. However, battery cells generally tend to have lower charge and discharge C-rates (around 1C) than power cells (up to 50C).

Cell heating is predominantly a function of current (C-rate) in both charge and discharge cycles. The heating is well approximated by $I^2R$ where I is the current and R is the internal resistance of the cell under direct current known as DCIR. DCIR changes with cell temperature and with aging. Because the I term is squared it is desirable to place as many cells in parallel as possible so as to reduce I and thus reduce heating.

However, cell temperature reduces effective DCIR so some external or internal cell heating is actually desirable for most efficiency charging and discharging. However, increasing cell temperature also increases the aging of the cells. Therefore, the beneficial and detrimental effects should be balanced.

Therefore, the present disclosure is directed to the development of size, weight and power (SWAP) and duty cycle improved battery systems for DEW applications on mobile platforms. The architecture of such battery systems includes a battery bank architecture having series and parallel connections between each of the battery cells to provide the necessary power and voltage required to operate a DEW system.

Battery system designs have two general characteristics that dominate the system topology: the number of cells in series denoted as "S" (e.g. four cells in series is denoted by "4S"); and the number of cells in parallel denoted as "P" (e.g. 3 cells in parallel is denoted by "3P"). Thus, a battery system cell arrangement is of the form XSYP where X is the number of cells in series (S) and Y is the number of cells in parallel (P). As an example, a 20S10P battery system has 10 cells connected in parallel, with 20 such parallel groups connected in series. Thus, the battery system contains 200 total cells.

As an example, in a 300 VDC class systems X will be 80 to 120 depending on cell nominal voltage. Y will depend on lasing time and duty cycle for a given total power draw. Table 1 illustrates an example 94SYP battery system with variable Y values depending on lasing time and duty cycle for a given total power draw, where the system is built from 4 Ah cells and the percentages shown are the depth of discharge. Table 2 illustrates the weights and volumes for the 94SYP battery system with variable Y values.

TABLE 1

Example System 94SYP/DoD per 10 kW of Laser Power

| | Duty Cycle | | | |
|---|---|---|---|---|
| Lasing Time | 20% | 30% | 40% | 50% |
| 30 | 3P/10% | 3P/10% | 3P/10% | 3P/10% |
| 60 | 3P/15% | 3P/15% | 3P/21% | 4P/15% |
| 90 | 3P/22% | 3P/31% | 4P/31% | 4P/22% |
| 120 | 3P/41% | 4P/27% | 4P/30% | 5P/23% |
| 150 | 4P/37% | 4P/37% | 5P/23% | 5P/29% |
| 180 | 4P/44% | 4P/43% | 5P/35% | 5P/35% |
| Recharge Power (kW) for full recharge | 10 | 15 | 23 | 38 |

TABLE 2

Example System 94SYP Size and Weight

| | 3P | 4P | 5P |
|---|---|---|---|
| Battery Mass (lb.) | 73 | 97 | 121 |
| Volume (Cu. ft.) | 0.42 | 0.56 | 0.70 |

The P ranges for the examples shown in Tables 1 and 2 are for a 35% efficient laser, wherein the P ranges may be increase if thermal and hotel loads are added because thermal effects of the battery system are a limiting factor. Higher or lower laser efficiencies will proportionally change P values (e.g. twice the efficiency yields half the P value). Higher or lower laser power will linearly change the P values. For example, moving from a 10 kW laser to for a 20 kW laser, 3P to 5P will move to 6P to 10P, and for a 50 kW laser the P values will be 15P to 25P.

As described herein, the battery bank may include a plurality of battery modules, with each module comprising a plurality of battery cells electrically connected in series or parallel. Each module within the battery bank is then connected to other modules by a different connection (i.e. series or parallel) relative to the connection between the battery cells. In some embodiments, the battery cells are of any shape, including cylindrical, rectangular, or other geometric shapes.

In some embodiments, the battery bank or battery module includes, or includes at least, 3, 6, 9, 10, 15, 30, 50, 75, 80, 100, 120, 150, 200 or 300 battery cells in series, or any range of values therebetween. In some embodiments, the battery bank or module includes, or includes at least, 3, 6, 9, 10, 15, 30, 50, 75, 80, 100, 120, 150, 200 or 300 battery cells in series per 10 kW of DEW output power, or any range of values therebetween. In some embodiments, the battery bank or module includes, or includes at least 2, 3, 4, 5, 6, 7, 8, 9, 10, 12, 15 or 20 battery cells in parallel, or any range of values therebetween. In some embodiments, the battery bank or module includes, or includes at least 2, 3, 4, 5, 6, 7, 8, 9, 10, 12, 15 or 20 battery cells in parallel per 10 kW of DEW output power, or any range of values therebetween. In some embodiments, the battery bank has a voltage of, of about, at least, or at least about, 150 VDC, 200 VDC, 225

VDC, 250 VDC, 275 VDC, 300 VDC, 325 VDC, 350 VDC, 375 VDC, 400 VDC or 500 VDC, or any range of values therebetween.

The battery cells comprise active materials, such as anode and/or cathode active materials. In some embodiments, the cathode active material can include a lithium metal oxide and/or a lithium sulfide. In some embodiments, the cathode active material may include lithium nickel manganese cobalt oxide (NMC), lithium manganese oxide (LMO), lithium nickel manganese oxide (LNMO), lithium iron phosphate (LFP), lithium cobalt oxide (LCO), lithium titanate (LTO), and/or lithium nickel cobalt aluminum oxide (NCA). In some embodiments, the cathode active material may include $LiNi_xMn_yCo_zO_2$ (NMC), $LiNi_{0.8}Co_{0.15}Al_{0.05}O_2$ (NCA), $LiFePO_4$ (LFP), $LiCoO_2$ (LCO), $LiMn_2O_4$ (LMO), $LiMn_{1.5}Ni_{0.05}O_4$ (LMNO), sulfur, and mixture of two or more such as NMC-NCA, NMC-LCO, NMC-NCA-LCO. The cathode active material can comprise sulfur or a material including sulfur, such as lithium sulfide ($Li_2S$), or other sulfur-based materials, or a mixture thereof. In some embodiments, the anode active material can include an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active material can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx). In some embodiments, the anode active material may include a graphite, a metal (Li, Si, Sn etc.), a metal oxide ($SiO_x$, SnO, $Li_4Ti_5O_{12}$ etc.), a graphite/metal composite, a graphite/metal oxide composite, and/or a graphite/metal/metal oxide composite.

In some embodiments, the battery bank may be constructed of lithium ion battery cells of high energy capacity which support fast charging and large discharge C-rates. Examples of such batteries include lithium nickel-cobalt-aluminum-oxide (NCA) type batteries. In one embodiment, the battery cells are connected in more parallel subpacks to achieve the high current (Amp) requirements to provide sufficient power to the laser system when it is in a firing mode. In one embodiment, a greater depth of energy on the platform can be achieved by selecting the proper battery cells, and also by increasing the number of battery cells and/or battery modules connected in series and/or parallel that make up the battery bank.

The battery system may form part of a directed energy weapon (DEW) system comprising a laser weapon. In some embodiments, the laser weapon has a power of about 1 kW, 5 kW, 10 kW, 15 kW, 20 kW, 25 kW, 30 kW, 40 kW, 50 kW, 60 kW, 80 kW, 100 kW, 150 kW, 200 kW, 300 kW or 500 kW, or any range of values therebetween. In one embodiment, the laser weapon has a relatively low power of less than 20 kW, for example 15 kW, 10 kW or 5 kW. Such a low power laser weapon, with a power of less than 20 kW, is likely to require electrical power of less than 75 kW. For example, the power needed to run a 20 kW or smaller laser may be 75 kW, 50 kW, or 35 kW depending on the efficiency of the laser being fired and the necessary magazine depth. Thus, a 20 kW laser may be powered by a 35 kW battery bank connected to a generator. The size of such a generator, if used, can be further reduced if adequate battery energy storage capacity is available to manage the energy requirements of the laser weapon and its desired duty cycle. The duty cycle is the time of active laser operation (lasing) divided by the time of active laser operation plus non-operation. As the necessary duty cycle of the laser weapon decreases, to below 75%, and especially if it is below 50% or even below 35% the energy needs are also reduced. Laser weapons with a relatively small required duty cycle may be powered by a battery bank as described herein, and recharged with a smaller generator that can run during lasing and non-lasing times to recharge the battery cells in the battery bank.

In some embodiments, the laser weapon is configured to have a lasing (i.e. discharge or firing) period of about 0.5 seconds, 1 seconds, 2 seconds, 3 seconds, 5 seconds, 8 seconds, 10 seconds, 15 seconds, 20 seconds, 30 seconds, 40 seconds, 50 seconds, 60 seconds, 75 seconds, 90 seconds, 100 seconds, 120 seconds, 150 seconds, 200 seconds, 250 seconds, 300 seconds, 400 seconds or 500 seconds, or any range of values therebetween. In one embodiment, the laser system has lasing periods of equal to or less than 120 seconds. For example, discharge periods may be 120, 100, 90, 60, 30 seconds or less. In one embodiment, the DEW system is a high energy laser system configured to fire for up to 120 seconds on, followed by 280 seconds of a recovery time. This results in a 30% duty cycle. Other duty cycles, particularly greater than 20% are specifically contemplated within the scope of the invention. In some embodiments, the laser has a duty cycle of about 15%, 20%, 25%, 30%, 50%, 60% or 80%, or any range of values therebetween. For example, the duty cycle may be 20%, 25%, 30%, 50% or even higher. In some embodiments, the charge periods are relatively short, such as less than 300 s. In some embodiments, the charge periods are less than 150, 120, 100, 60, or even 30 seconds.

The ancillary components on a DEW platform, such as the hotel loads, are usually powered by the generator and/or the battery bank. In some embodiments, the hotel loads are powered through the battery bank, which itself is charged by the generator to provide the necessary power to all powered equipment on the platform and/or the laser during firing episodes. For example, a 35 kW generator may charge a battery bank during quiescent times as well as during firing when the laser system is active. During firing episodes, the laser may use energy stored in the battery bank while the generator engages to recharge the batteries as the laser is firing. The "magazine depth" of a laser weapon is the aggregate optical energy output for a specific firing period. Providing a battery bank along with the portable generator can give the laser a high magazine depth so that it can continue firing repeatedly during a specific firing period without overloading the electrical energy demands upon the portable generator.

In addition, as discussed herein, a vapor compression system and/or a fan system managed by the control system may provide flexible cooling options to maintain the battery bank at an operational temperature during these burst mode firing periods so that the high magazine depth of the laser may be reached without overheating the battery bank. The fan system using a plurality of fans and ambient air, without additional cooling power, may be sufficient to maintain the battery bank within operational temperatures. Since no additional cooling power from the vapor compression system may be required, the power requirements to cool the battery bank may be relatively low.

In some embodiments, the system includes a generator connected to and provides electrical output to the battery system, the DEW, and/or the cooling/heating system. In some embodiments, the generator is connected to and powers the fan system, the battery bank and/or the sensors. In some embodiments, the generator is stationary and provides shore power to the system. In other embodiments, the generator is mobile and provides power to the system through the use of a fuel source. In some embodiments, the system is configured to recharge between 10%, 20%, 30%, 40%, 50%, 60%, 70%, 80%, 85%, 90%, 95%, 100%, or any range of values therebetween, of the discharged capacity of the battery bank.

In some embodiments, the battery bank is connected to and provides electrical output to the DEW, the cooling/heating system, the fan system, and/or the sensors. In some embodiments, the system is configured to discharge at, at about, above, or above about, 10%, 20%, 30%, 40%, 50%, 60%, 70%, 80% or 85%, or any range of values therebetween, of the usable capacity of the battery bank during a lasing period.

In some embodiments, the platform may also include one or more hotel loads. As used herein a hotel load may include radar systems, batteries, power modules, motors, computers, electronics, optics, electronic warfare equipment and in some cases generators, if not directly air cooled, as well as other equipment that is ancillary to the main weapon system. In particularly warm environments, such as the desert, these additional components may work more efficiently by being cooled prior to use. In particularly cold environments, such as during winter or northern areas or high elevations, these additional components may need to be heated to a target operating temperature in order to work more efficiently or work without failure. Thus, in one embodiment, the vapor compression system acts as an ancillary cooling/heating system configured to cool or heat these additional hotel load components (as well as the laser diode amplifiers) to a predetermined temperature, or within a temperature range, so that they operate reliably in many types of environments. In addition, the vapor compression system may be used to recharge and cool the thermal energy storage system prior to the time the directed energy weapon system is in use.

As discussed above, the system includes a control system. In some embodiments, the control system is in electrical communication with the fan system, the DEW system, the cooling/heating system, the battery system, the generator, or combinations thereof. The control system may also be in communication with a plurality of sensors that monitor each component on the platform. For example, the control system may be in electrical communication with temperature and voltage sensors within the battery bank.

The battery bank may be designed to function while the batteries are operating between a low temperature of 10° C. and a high temperature of 55° C. If the control system determines through a temperature sensor that batteries in the battery bank are near the lower temperature 10° C., then the control system may initially heat the batteries by running warmed heat transfer fluid through a heat exchanger adjacent to the battery bank fan system, and blowing warmed air through the battery banks. If the temperature of the battery bank is at a higher temperature, above the optimum operating temperature, the control system can then prioritize cooling of the battery bank, and therefore use output of the vapor compression system to cool the heat transfer fluid and run the cooled heat transfer fluid to the heat exchanger connected to the battery bank. In addition, the control system may modify the number of active fans and/or speed of the fans of the fan system to maintain the temperature of the battery bank within a predefined temperature range.

In some embodiments, a control system is configured to prevent the temperature of the battery cells, battery modules, and/or battery bank from rising above a predetermined threshold while the DEW is active and consuming energy from the battery bank, during charging of the battery cells, during discharge of the battery cells, between discharge cycles of the battery cells, or combinations thereof. In some embodiments, the predetermined threshold is, or is about, 20° C., 30° C., 40° C., 50° C., 60° C., 70° C., 80° C., 90° C. or 100° C., or any range of values therebetween.

In some embodiments, the control system is configured to provide warmed heat transfer fluid from the cooling/heating system to the heat exchanger. In some embodiments, the control system is configured to provide warmed heat transfer fluid from the cooling/heating system to the heat exchanger when the temperature of the battery cells is at, at about, at least, at least about, below, or below about, −5° C., 0° C., 5° C., 10° C., 15° C., 20° C., 25° C., 30° C., 35° C. or 40° C., or any range of values therebetween.

In some embodiments, the control system is configured to provide cooled heat transfer fluid from the cooling/heating system to the heat exchanger. In some embodiments, the control system is configured to provide cooled heat transfer fluid from the cooling/heating system to the heat exchanger when the temperature of the battery cells is at, at about, at most, at most about, above, or above about, 15° C., 20° C., 25° C., 30° C., 35° C., 40° C., 45° C., 50° C., 55° C., 60° C., 65° C., 70° C., 80° C. or 100° C., or any range of values therebetween.

It should be realized that the DEW platform may be configured to operate in a variety of environmental conditions. In hot temperatures, such as in the dessert or during the summer, or during or after use of the DEW, the control system may be configured to turn on or run the fan system at a relatively high rate of speed and/or adjust the heating/cooling system may be used to provide cooled heat transfer fluid at high speeds to the battery bank heat exchanger once high temperatures are measured through the temperature sensors. In cold environments, the DEW or ancillary equipment may need to be heated to maintain their operability. In some embodiments, the control system is configured to adjust the heating/cooling system to provide heated heat transfer fluid at high speeds to the battery bank heat exchanger and/or to turn on or run the fan system at a relatively high rate of speed once high temperatures are measured through the temperature sensors.

Referring now to FIG. 1, a directed energy weapon (DEW) platform 100 is shown. The platform 100 includes a battery system 102, a laser 104, a cooling/heating system 106, a generator 108, a control system 110, and a laser heat exchange system 112. The battery system 102 includes a battery heat exchange system 118, a fan system 120, a battery bank 122, and a sensor system 124. The control system 110 is in electrical communication with the battery system 102, the laser 104, the cooling/heating system 106, and the generator 108. The generator 108 and/or the battery bank 122 provide power to the laser 104, cooling/heating system 106, fan system 120 and sensor system 124 through power lines 116, wherein the generator 108 may also provide power to the battery bank 122. The cooling/heating system 106, laser heat exchange system 112 and battery heat exchange system 118 are in fluid communication through fluid lines 114.

The control system 110 electronically communicates with the various controllable components located on the DEW platform 100 for efficiently cooling or heating the components. For example, the control system 110 may activate or modify the performance of the fan system 120 and/or the cooling/heating system 106 due to electrical signals received from the temperature sensors. For example, the control system 110 may be configured to activate or modify a vapor compression system of the cooling/heating system 106 to heat or cool the heat exchange fluid, and to change the state (e.g. open or close) valves of the fluid line 114 thereby increasing or decreasing the flow rate of the heat exchange fluid reaching the laser heat exchange system 112 and/or battery heat exchange system 118. A control system 110 configured as such allows for the control of the overall temperature of the battery modules, as well as the temperature gradient within the battery modules.

Figure 2:
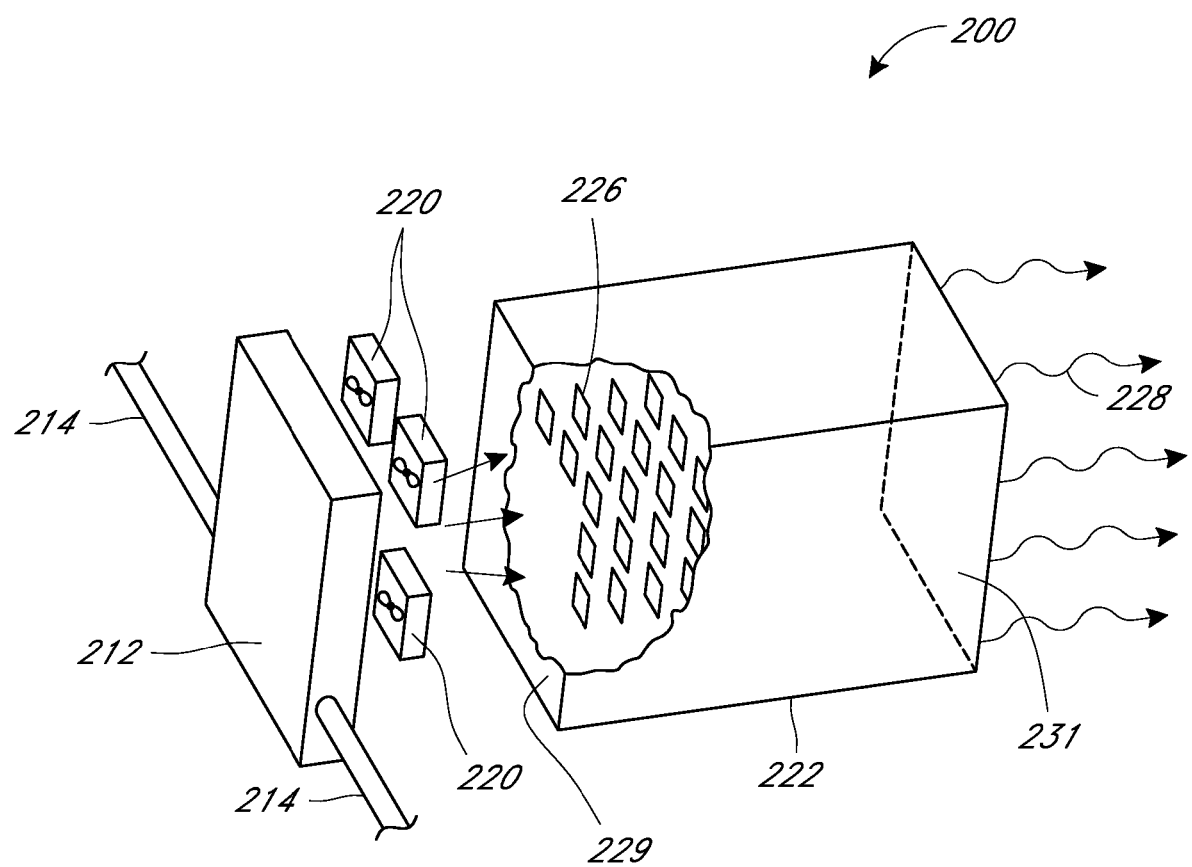
FIG. 2 is a cutaway illustration of a battery system according to some embodiments.

Referring to FIG. 2, a battery system 200 is shown. The battery system 200 includes a heat exchanger 212 with fluid lines 214, fans 220, and a battery bank 222. The battery bank 222 is shown cut away to reveal a plurality of battery cells 226. Air flow 228 from fans 220 is illustrated passing from a first side 229 (e.g. a proximal side) of the battery bank 222 to a second side 231 (e.g. a distal side) passing the plurality of battery cells 226. In some embodiments, the fans 220 may instead pull (i.e. draw) air, and therefore air flow 228 from fans 220 may pass to the first side 229 of the battery bank 222 from a second side 231 passing the plurality of battery cells 226. In such a system, the heat exchanger 212 may be located on the opposite side of the battery bank 222 relative to the fans 220. As such, the fans may facilitate passing heated or cooled air surrounding the heat exchanger 212 through the battery bank 222 and passing the plurality of battery cells 226, thereby heating or cooling the battery cells 226.

It will be appreciated that as the air flow 228 passes from a first side 229 to a second side 231 of the battery bank 222, the temperature of the air may change due to heat exchange with the battery cells. For example, if relatively cool air is being passed through the battery bank 222 in order to decrease the temperature of the relatively hot battery cells 226, then a gradient of air temperature is developed in the air flow 228 as the air flow 228 is passed from a first side 229 to a second side 231 of the battery bank 222, wherein the temperature of the air increases from the first side 229 to the second side 231. Similarly, a temperature gradient would exist within the battery bank, wherein the temperature of the plurality of battery cells 226 increases from the first side 229 to the second side 231.

Figure 3:
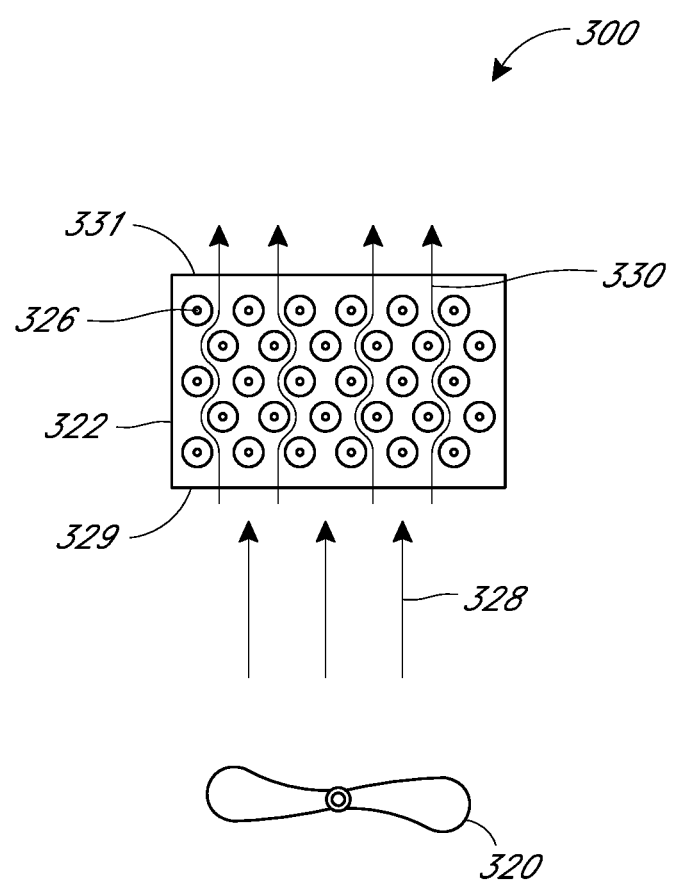
FIG. 3 is a cross-sectional illustration of a battery system according to some embodiments.

Referring to FIG. 3, a battery system 300 is shown in top view cross-section. Similar to FIG. 2, air flow 328 from fans 320 is illustrated passing from a first side 329 (e.g. a proximal side) of a battery bank 322 to a second side 331 (e.g. a distal side) passing the plurality of battery cells 326. FIG. 3 illustrates that air flow 328 passes passed the plurality of battery cells 326 through a spacing 330 between the surfaces of each battery cell 326 and its neighbor.

Figure 4:
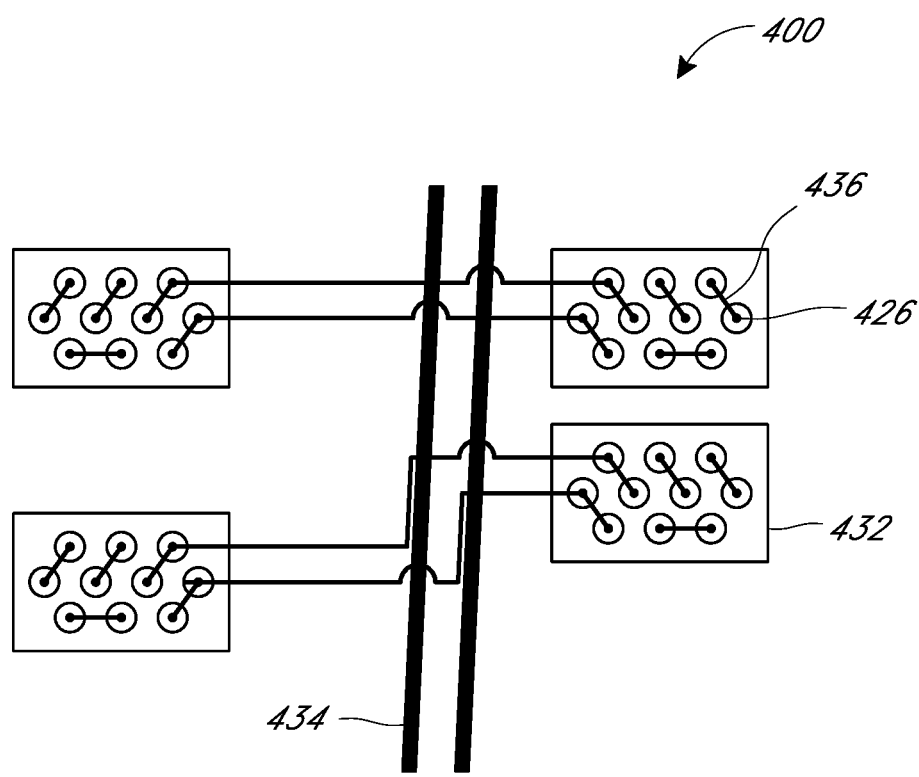
FIG. 4 is a schematic of a battery bank according to some embodiments.

Referring to FIG. 4, a battery bank 400 is shown. The battery bank 400 includes a plurality of battery modules 432 comprising battery cells 426 electrically connected in series as shown by series connection 436, and wherein the plurality of battery modules 432 are electrically connected through the parallel bus 434. Alternatively, in some embodiments the battery bank includes a plurality of battery modules comprising battery cells electrically connected in parallel, and wherein the plurality of battery modules are electrically connected through the series bus.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A system for powering a weapon, comprising:
a module comprising a plurality of battery cells;
an air flow path through the module defined by a spacing between a surface of each battery cell and its neighboring battery cell;
one or more fans positioned to move air through the air flow path;
a temperature sensor configured to measure a temperature within the module;
an electrical output configured to provide electrical power from the module to the weapon;
a heat exchanger configured to receive a heat exchange fluid, wherein the air moved by the one or more fans comprises air surrounding the heat exchanger;
a valve controlling a flow of the heat exchange fluid; and
a control system configured to control the valve, wherein the control system controls the valve based on the temperature sensed by the temperature sensor to provide cooling via airflow from the one or more fans to maintain a temperature gradient of less than about 15° C. from a first side of the module to a second side of the module, and further to prevent the temperature from rising above a predetermined threshold while the weapon is active and consuming the electrical power from the module.

2. The system of claim 1, wherein the spacing between adjacent battery cells is at least about 2 mm.

3. The system of claim 2, wherein the spacing between adjacent battery cells is about 2-10 mm.

4. The system of claim 1, wherein the control system is configured to prevent the temperature of the battery cells from rising above the predetermined threshold during charging of the battery cells.

5. The system of claim 1, wherein the predetermined threshold is about 80° C.

6. The system of claim 1, wherein the predetermined threshold is about 70° C.

7. The system of claim 1, wherein the predetermined threshold is about 60° C.

8. The system of claim 1, wherein the predetermined threshold is about 40° C.

9. The system of claim 1, wherein each module comprises between 80 and 120 battery cells in series.

10. The system of claim 1, wherein:
the module is one of a plurality of modules, wherein each module comprises a separate plurality of battery cells electrically connected in series or parallel, and wherein each module is connected in series or parallel to one or more other modules in the plurality of modules to form a battery bank; and the electrical output is configured to provide electrical power from the plurality of modules to the weapon.

11. The system of claim 10, wherein the battery bank comprises between 3 and 5 modules connected in series or parallel.

12. The system of claim 10, wherein the weapon is configured to receive at least one of:
 10 kW of electrical power when the battery bank has between 3 and 5 modules in series or parallel;
 20 kW of electrical power when the battery bank has between 6 and 10 modules in series or parallel; or
 30 kW of electrical power when the battery bank has between 9 and 15 modules in series or parallel.

13. The system of claim 10, wherein the weapon is configured to receive at least 30 kW of power and the battery bank has between 9 and 15 modules in series or parallel.

14. The system of claim 10, wherein the weapon is configured to receive at least 50 kW of power and the battery bank has between 15 and 25 modules in series or parallel.

15. The system of claim 10, wherein the weapon is configured to receive at least 100 kW of power and the battery bank has between 30 and 50 modules in series or parallel.

16. The system of claim 10, wherein the weapon is configured to receive at least 300 kW of power and the battery bank has between 90 and 150 modules in series or parallel.

17. The system of claim 1, wherein the heat exchanger is connected to a cooling/heating system that provides warmed heat transfer fluid to the heat exchanger when the temperature of the battery cells is below 20° C.

18. The system of claim 1, further comprising a generator configured to recharge one or more of the battery cells.

19. The system of claim 10, wherein the system is configured to discharge above 30% of the usable capacity of the battery bank during a discharge period of the weapon.

20. The system of claim 10, wherein the system is configured to recharge between 50% to 100% of a discharged capacity of the battery bank.

21. The system of claim 1, wherein the weapon is configured to have a discharge period of less than 10 seconds.

22. The system of claim 1, wherein the weapon is configured to be active for a discharge period of between about 30-200 seconds.

23. The system of claim 1, wherein the battery cells comprise lithium ion battery cells comprising a plurality of active materials.

24. The system of claim 23, wherein the plurality of active materials comprises lithium nickel cobalt aluminum oxide (NCA).

25. The system of claim 1, wherein the control system is configured to provide cooling via airflow from the one or more fans to maintain a temperature gradient of less than 5° C. from a first end to a second end of each battery cell.

26. The system of claim 1, further comprising:
a cooling/heating system configured to provide heat transfer fluid, wherein the heat exchange fluid is a first portion of the heat transfer fluid;
a weapon heat exchange system configured to receive a second portion of the heat transfer fluid from the cooling/heating system; and
a second temperature sensor configured to measure a temperature of one or more components of the weapon,
wherein the control system is configured to control the valve based on the temperature sensed by the second temperature sensor.

27. The system of claim 10, wherein the battery bank has a voltage of 275-325 VDC.

28. The system of claim 1, wherein the weapon is a laser weapon.

29. The system of claim 1,
wherein the one or more fans are positioned to move air through the air flow path using a one or more active fans operating at one or more fan speeds,
wherein the one or more fans include the one or more active fans, and
wherein the control system is configured to modify, based on the temperature sensed by the temperature sensor, at least one of:
 the number of the one or more active fans operating; or
 the one or more fan speeds.

30. A system for powering a laser weapon, comprising:
a plurality of modules, wherein each module includes a plurality of cylindrical battery cells electrically connected in series or parallel, and wherein each module is connected in series or parallel to other modules to form a battery bank;
an air flow path through each module defined by a spacing between a cylindrical surface of each battery cell and its neighboring battery cell;
one or more fans positioned to move air through the air flow path;
a temperature sensor configured to measure a temperature within the module;
an electrical output configured to provide electrical power from the module to the laser weapon;
a heat exchanger configured to receive a heat exchange fluid, wherein the air moved by the one or more fans comprises air surrounding the heat exchanger;
a valve controlling a flow of the heat exchange fluid; and
a control system configured to control the valve, wherein the control system controls the valve based on the temperature sensed by the temperature sensor to provide cooling via airflow from the one or more fans to maintain a temperature gradient of less than about 15° C. from a first side of each module to a second side of each module, and further to prevent a temperature of the battery cells from rising above a predetermined threshold while the laser weapon is active and consuming the electrical power from the battery bank.

* * * * *